US012783649B2

(12) United States Patent
Singh et al.

(10) Patent No.: US 12,783,649 B2
(45) Date of Patent: Nov. 3, 2026

(54) QUANTUM COMPUTING FRAUD PROTECTION SYSTEM

(71) Applicant: Bank of America Corporation, Charlotte, NC (US)

(72) Inventors: Shailendra Singh, Maharashtra (IN); Saurabh Gupta, New Delhi (IN); Varsha Yadav, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 67 days.

(21) Appl. No.: 18/582,207

(22) Filed: Feb. 20, 2024

(65) Prior Publication Data

US 2025/0265333 A1 Aug. 21, 2025

(51) Int. Cl.
*G06F 21/50* (2013.01)
*G06F 21/12* (2013.01)
*G06F 21/55* (2013.01)
*G06F 21/72* (2013.01)

(52) U.S. Cl.
CPC ...... *G06F 21/554* (2013.01); *G06F 2221/034* (2013.01)

(58) Field of Classification Search
None
See application file for complete search history.

(56) References Cited

U.S. PATENT DOCUMENTS 10,290,053 B2 5/2019 Priess et al.
10,325,271 B2 6/2019 Miltonberger
10,872,341 B1 12/2020 Beckman et al.
11,521,024 B2 12/2022 Chen et al.
11,537,381 B2 12/2022 Gambetta et al.
11,687,821 B2 6/2023 Naveh et al.
(Continued)

FOREIGN PATENT DOCUMENTS

CN 119312327 A * 1/2025 ............ G06N 10/60
CN 120124052 A * 6/2025 ............ G06N 10/60

OTHER PUBLICATIONS

Case Study-Based Approach of Quantum Machine Learning in Cybersecurity: Quantum Support Vector Machine for Malware Classification and Protection. Akter. IEEE. (Year: 2023).*
(Continued)

*Primary Examiner* — Venkat Perungavoor
(74) *Attorney, Agent, or Firm* — Banner & Witcoff, Ltd.

(57) ABSTRACT

A quantum computing fraud protection system may utilize a bagging cascading machine learning technique to analyze all the aspects of quantum code and/or program being sent via a quantum as a service interface to a quantum computing system. The quantum computing fraud protection system determines an intent and predicts output of the quantum code. The quantum computing fraud protection system utilizes bootstrap aggregating to learn from all the aspects of program information in parallel and combines the results using an ensemble technique for determining the output. All aspects of the quantum code and/or program (e.g., program input, program source, program owner, program downloads, program resource utilization, program firewall access mechanism, program output, and the like) is analyzed and contributes towards an identified intent of the program before that program released to the quantum computer for processing.

20 Claims, 7 Drawing Sheets

(56) References Cited

U.S. PATENT DOCUMENTS

| | | | |
|---|---|---|---|
| 2017/0357977 A1 | 12/2017 | Pitz et al. | |
| 2020/0104739 A1 | 4/2020 | Sharma et al. | |
| 2021/0312047 A1* | 10/2021 | Chen | H04L 9/0858 |
| 2023/0031123 A1 | 2/2023 | Giokas | |
| 2023/0126764 A1* | 4/2023 | Ibrahim | G06N 10/20 705/44 |
| 2023/0155822 A1* | 5/2023 | Chen | H04L 9/002 257/14 |
| 2023/0401086 A1* | 12/2023 | Healy | G06F 9/4843 |
| 2024/0163298 A1* | 5/2024 | Wang | H04L 63/1416 |
| 2024/0333484 A1* | 10/2024 | Kim | H04L 9/0852 |
| 2025/0023720 A1* | 1/2025 | Lim | H04L 9/0861 |
| 2025/0147806 A1* | 5/2025 | Fong | G06N 10/80 |

OTHER PUBLICATIONS

Cascade Bagging for Accuracy Prediction with Few Training Samples. Zhang et al. (Year: 2021).*

Automated Vulnerability Detection in Source Code Using Quantum Natural Language Processing. Akter et al. (Year: 2023).*

* cited by examiner

```
from qiskit import QuantumCircuit, QuantimRegister, ClassicalRegister
from qiskit import Aer, execute

n_steps = 4                  #Number of steps

#Defining the shift gate

shift_q = QuantumRegister (3)                                       #3qubit register
shift_circ = QuantumCircuit (shift_q, name='shift_circ')            #Circuit for shift operator
shift_circ.ccx (shift_q[0],  shift_q[1],  shift_q[2])               #Toffoli gate
shift_circ.cx ( shift_q[0],  shift_q[1] )                           #CNOT gate
shift_circ.x ( shift_q[0] )
shift_circ.x ( shift_q[1] )
shift_circ.ccx (shift_q[0],  shift_q[1],  shift_q[2])
shift_circ.x ( shift_q[1] )
shift_circx.cx ( shift_q[0],  shift_q[1] )

shift_gate = shift_circ.to_instruction()                            #Convert the circuit to a gate

q = QuantumRegister (3, name='q')                                   #3 qubit register
c = ClassicalRegister (3, name='c')                                 #3 bit classical register
circ = QuantumCircuit (q, c)                                        #Main circuit
for i in range (n_steps):
     circ.h (q[0])                                                  #Coin step
     circ.append (shift_gate, [q[0], q[1], q[2]])                   #Shift step

circ.measure ([q[0], q[1], q[2]], [c[0], c[1], c[2]])
```

FIG. 6

QUANTUM COMPUTING FRAUD PROTECTION SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization. In some cases, computing products and services offered by an organization may include quantum computing as a service.

As such, in this era of advancing quantum computing technology, a pressing issue emerges—the potential for unauthorized access to and/or use of quantum computers offered as a service. This unauthorized access may result in the deployment of malware by malicious entities from external organizations, after leveraging the computational power offered via quantum computing. Indeed, critical challenges surround the use and security of quantum as a service (QaaS) platforms. These challenges emphasize a need to safeguard against unauthorized utilization of quantum resources for malicious purposes, thus ensuring the integrity and trustworthiness of quantum computing environments in an

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes analyzing executable code, identifying an intent of the code, and the output of the code before executing the code on a quantum computer.

Aspects of the disclosure relate to computer hardware and software. In particular, one or more aspects of the disclosure generally relate to computer hardware and software for analyzing code for processing on a quantum computing system before execution and proactively preventing malicious code from being run.

A quantum computing fraud protection system may utilize a bagging cascading machine learning algorithm to enable fraud prevention for quantum computing technologies. The quantum computing fraud protection system may be capable of analyzing and identifying the output and intent of any quantum computing executable code and/or program communicated to a QaaS enabled system before execution of the quantum computing executable code and/or program on a quantum computer.

The quantum computing fraud protection system is capable of analyzing all the quantum computing code and/or programs, before being sent to the quantum computer via a QaaS. The quantum computing fraud protection system will run the executable code on a computing platform before being executed on the quantum computer to identify the output, intent, intent source, intent owner, and the like of the executable quantum code and/or programs. The executable quantum code and/or programs will be sent to the quantum computer only if the executable quantum code and/or programs are legitimate and/or and do not include risk of including malware or pose a security risk.

On identification of a potential risk and security threat, the quantum computing fraud protection system will alert the quantum computer services provider, the source organization, and/or will automatically take necessary precautions (e.g., disabling network access) and/or request approval before it allowing the execution on the quantum computer. Technology will be capable of rejecting such request as well.

The quantum computing fraud protection system may incorporate a bagging cascading machine learning technique and/or algorithm to analyze all the aspects of the quantum code and/or program being sent through quantum as a service, on an identified analysis (e.g., devops) platform. The quantum computing fraud protection system may then provide the best suitable judgement on the intent and output of the quantum code and/or program being sent. A bagging technique, also known as bootstrap aggregating, learns from all the aspects of the information (e.g., quantum code, a program) in parallel at the same time (not sequentially) and combines the results using an ensemble technique for determining the output. All aspects of the quantum code and/or program (e.g., program input, program source, program owner, program downloads, program resource utilization, program firewall access mechanism, program output, and the like) may be analyzed and all may contribute in combination to decide the final intent of the program before that program is provided to the quantum computer to be processed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6 shows illustrative quantum computing code, in accordance with one or more aspects described herein.

DETAILED DESCRIPTION

Figure 1A:
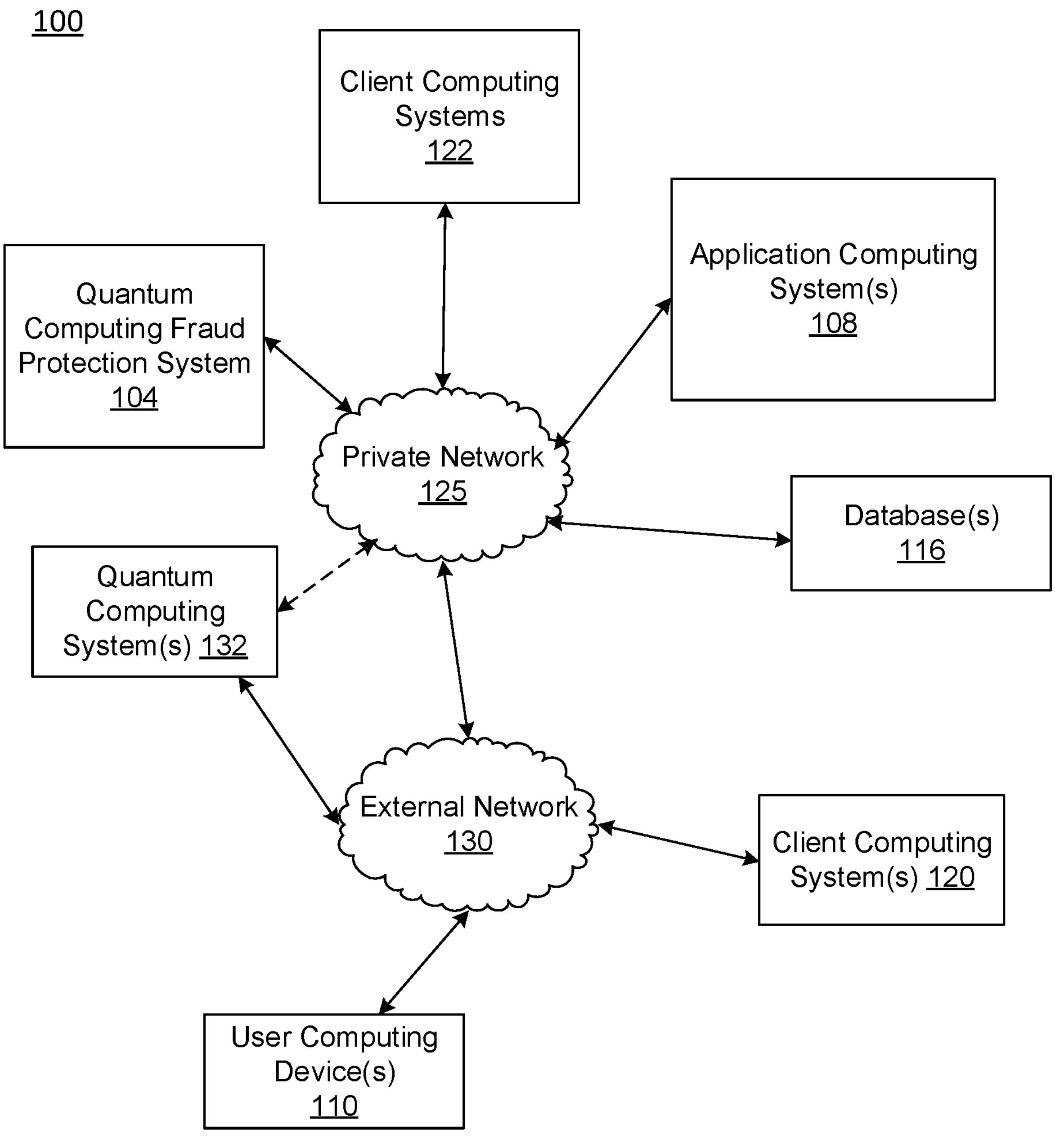
FIG. 1A shows an illustrative computing environment for analysis and risk assessment of executable quantum code and/or programs before execution on a quantum computer, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

A quantum computing fraud protection system may include a bagging cascading machine learning (ML) enabled computing device to perform fraud prevention and/or security risk analysis of quantum computing code or programs before execution by a quantum computing system. Illustrative quantum code is shown in FIG. 6. In general, the quantum computing fraud protection system may be capable of executing, e.g., simulation of quantum computing code or program execution, and identifying the output and intent of the quantum computing code or program sent to a quantum as a service interface, before running the quantum computing code or program on a quantum computer.

The quantum computing fraud protection system may analyze all the quantum computing code or programs beforehand, for example before sending to quantum computer, after being received via a quantum as a service interface. The quantum computing fraud protection system may operate each quantum computing code segment or program on one or more identified devops platform before running on quantum computer. Each devops platform may comprise a computing device configured for analyzing quantum computing code or programs based on a particular QaaS interface, program source, output destination, or other characteristic of the quantum computing code or program. Each devops platform may comprise an analysis system processing machine learning algorithms to understand the output, intent, intent source, intent owner of the quantum computing code or program. The analysis system sends the quantum computing code or program to a quantum computer for execution only if the program is identified to be legitimate and does not pose any malware or security risk. Otherwise, the quantum computing fraud protection system may generate a security report, generate an alert, initiate a risk mitigation process at a program source, and/or the like.

In some cases, the quantum computing fraud protection system generates a quantum program intension score based on the program analysis. The quantum computing fraud protection system may then, based on this quantum program intension score, the quantum computing fraud protection system will either accept the quantum computing code or program for execution, or reject the quantum computing code or program from being executed and initiate a security risk mitigation response. For example, on identification of a potential risk and/or security threat, the quantum computing fraud protection system will alert quantum computer, source organization, take necessary prevention steps, and/or seek approval for overriding the identified risk or security threat before the quantum computing fraud protection system allows the execution on quantum computer. In some cases, the quantum computing fraud protection system may be capable of rejecting such requests as well.

The quantum computing fraud protection system may include one or more computing platforms enabled to implement a bagging cascading machine learning algorithm to proactively analyze all the aspects of the quantum computing code and/or program receive via a quantum as a service interface. In some cases, multiple analysis platforms may exist and the quantum computing fraud protection system may rout the quantum computing code or program to one or more analysis platforms based on, for example, code complexity, available computational power at each platform, and the like. In some cases, each analysis platform may provide its training data to one or more other analysis platform to ensure consistent training of the machine learning algorithms. The quantum computing fraud protection system may then provide the best suitable judgement on the intent and output of the program being sent based on the analysis. The bagging cascading technique allows for parallel learning and/or analysis of multiple aspects of the quantum computing code and/or program and combines them for determining the output. For example, all aspects of the quantum computing code and/or program such as program input, program source, program owner, program output, program downloads, program resource utilization, program firewall access mechanisms, and the like will all contribute in combination to formulate a final intent of the quantum computing code and/or program. Based on this intent, the quantum computing fraud protection system either allows execution of the quantum computing code or program on the quantum computer or rejects the quantum computing code or program and initiates a security response based on the identified intent.

FIG. 1A shows an illustrative computing environment 100 for analysis and risk assessment of executable quantum code and/or programs before execution on a quantum computer, in accordance with one or more arrangements. The computing environment 100 may comprise one or more devices (e.g., computer systems, communication devices, and the like). The computing environment 100 may comprise, for example, a quantum computing fraud protection system 104, one or more application computing systems 108, one or more client computing systems 120, and/or one or more database(s) 116. The one or more of the devices and/or systems, may be linked over a private network 125 associated with an enterprise organization (e.g., a financial institution, a business organization, an educational institution, a governmental organization and the like). The computing environment 100 may additionally comprise one or more client computing systems 120, one or more quantum computing systems 132, and one or more user devices 110 connected, via a public network 130, to the devices in the private network 125. In some cases, the quantum computing systems 132 may be communicatively coupled to the private network 125 and/or the public network 130. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3rd Generation Partnership Project (3GPP) cellular protocol, a hypertext transfer protocol (HTTP), etc.). While FIG. 1A shows the quantum computing fraud protection system 104 as being a separate computing system, the quantum computing fraud protection system 104 may be implemented as a portion of one or more computing systems, such as the application computing systems 108, the client computing systems 120, 122, the quantum computing systems 132 and/or the like.

The quantum computing fraud protection system 104 may comprise one or more computing devices and/or other computer components (e.g., processors, memories, communication interfaces) configured to perform one or more functions as described herein. Further details associated with the architecture of the quantum computing fraud protection system 104 are described with reference to FIG. 1B.

The application computing systems 108 and/or the client computing systems 122 may comprise one or more computing devices and/or other computer components (e.g., processors, memories, communication interfaces). In addition, the application computing systems 108 and/or the client computing systems 122 may be configured to host, execute, and/or otherwise provide one or more enterprise applications. In some cases, the application computing systems 108 may host one or more services configured facilitate operations requested through one or more API calls, such as data retrieval and/or initiating processing of specified functionality. In some cases, the client computing systems 122 may be configured to communicate with one or more of the application computing systems 108 such as via direct communications and/or API function calls and the services. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The client computing systems 122 and/or the application computing systems 108 may comprise various servers and/or databases that store and/or otherwise maintain account information, such as financial account information including account balances, transaction history, account owner information, and/or other information. In addition, the client computing systems 122 and/or the application computing systems 108 may process and/or otherwise execute transactions on specific accounts based on commands and/or other information received from other computer systems comprising the computing environment 100. In some cases, one or more of the client computing systems 122 and/or the application computing systems 108 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 120 may comprise one or more computing devices and/or other computer components (e.g., processors, memories, communication interfaces). The client computing systems 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing systems 120 is for processing an electronic exchange of goods and/or services. The client computing systems 120 may be associated with a specific goods purchasing activity, such as purchasing a vehicle, transferring title of real estate may perform communicate with one or more other platforms within the client computing systems 120. In some cases, the client computing systems 120 may integrate API calls to request data, initiate functionality, or otherwise communicate with the one or more application computing systems 108, such as via the services. For example, the services may be configured to facilitate data communications (e.g., data gathering functions, data writing functions, and the like) between the client computing systems 120 and the one or more application computing systems 108.

The quantum computing system(s) 132 may be provided by one or more different organizations and may be separate from the enterprise network (e.g. accessible via the external or public network 130) and/or within the enterprise network (e.g., accessible via the private network 125). In some cases, quantum computing may be provided as a service to one or more organizations or business units to facilitate complex computing operations. Such computing environments allow users to build quantum computing programs via a quantum computing associated programming language, either remotely within the quantum computing system 132 or remotely within a user's computing environment. The quantum computing algorithm may be tested, such as via a quantum computing simulator, to ensure operation and to allow debugging of the quantum computing code before running on a quantum computer. Once tested, the user may submit their quantum computing code and/or program for running on a quantum computer, such as via a quantum computing as a service interface. In some cases, the user may be given an opportunity to run their quantum computing code and/or program on one or more different quantum computers and/or within a combined classical and quantum computing environment combining classical and quantum computing resources within a hybrid environment. Outputs may be provided to the originator (e.g., originating computing system or device such as a user device 110, a client computing system 120, 122, an application computing system 108, and/or the like).

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the quantum computing fraud protection system 104. For example, the database(s) 116 may store historical quantum code analysis, program intent information, program output threat patterns, and the like. In an arrangement, the database(s) 116 may be used for other purposes as described herein. In some cases, the client computing systems 120 may write data or read data to the database(s) 116 via the services.

In one or more arrangements, the quantum computing fraud protection system 104, the application computing systems 108, the client computing systems 122, the client computing systems 120, the user devices 110, the quantum computing systems 132, and/or the other devices/systems in the computing environment 100 may be any type of computing device capable of receiving input via a user interface, and communicating the received input to one or more other computing devices in the computing environment 100. For example, the quantum computing fraud protection system 104, the application computing systems 108, the client computing systems 122, the client computing systems 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the quantum computing fraud protection system 104, the API route testing system 105, the application computing systems 108, the client computing systems 122, the client computing systems 120, the user devices 110, and/or the other devices/systems in the computing environment 100 may, in some instances, be and/or comprise special-purpose computing devices configured to perform specific functions.

Figure 1B:
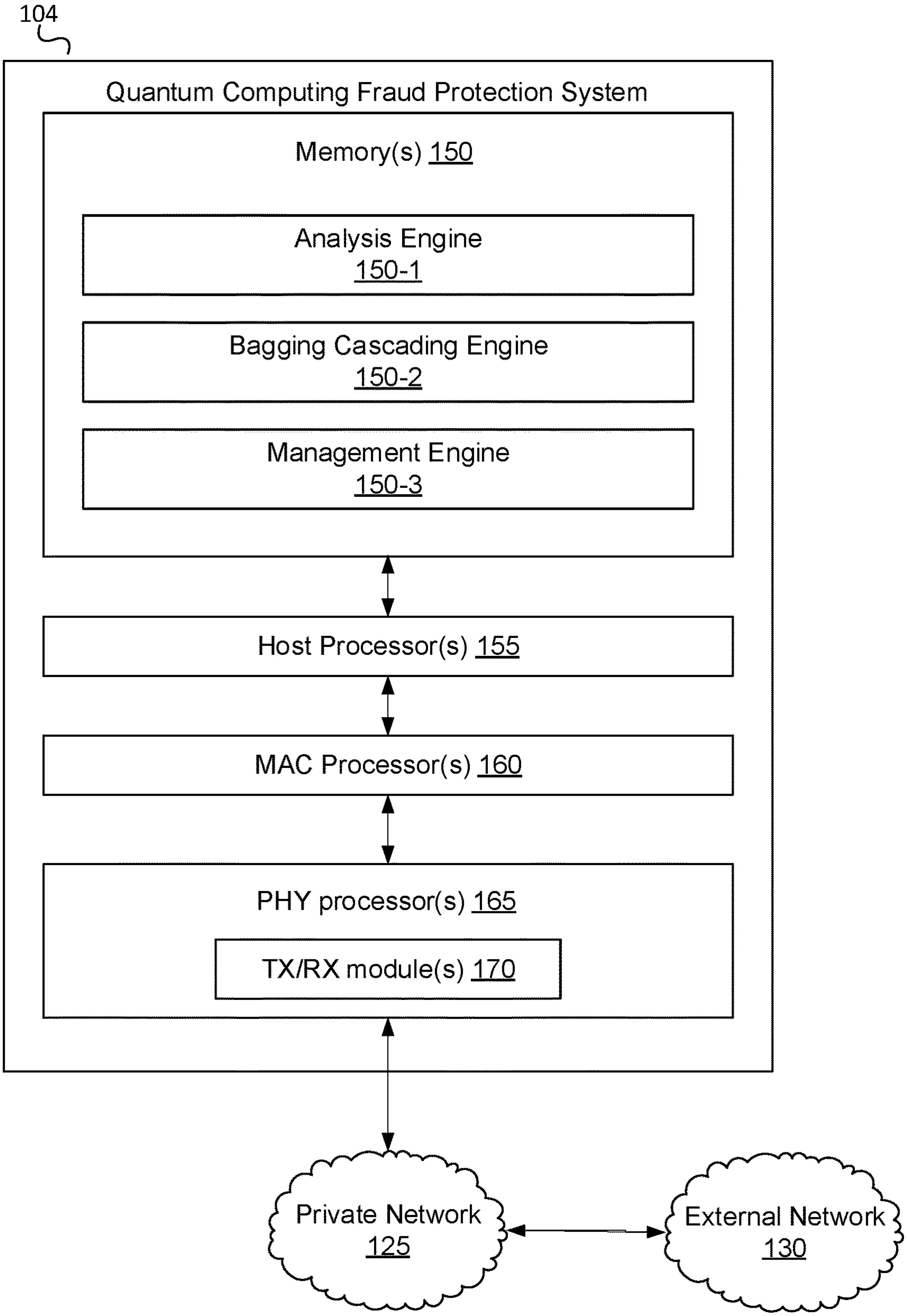
FIG. 1B shows an illustrative computing platform enabled for analysis of executable quantum code and/or programs before execution on a quantum computer, in accordance with one or more aspects described herein.

FIG. 1B shows an illustrative quantum computing fraud protection system 104 in accordance with one or more examples described herein. The quantum computing fraud protection system 104 may be a stand-alone device and/or may at least be partial integrated with the quantum computing fraud protection system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The quantum computing fraud protection system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the quantum computing fraud protection system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 125. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the quantum computing fraud protection system 104 may be configured to execute machine readable instructions stored in memory 150. The memory 150 may comprise (i) one or more program modules/engines having instructions that when executed by the one or more processors cause the quantum computing fraud protection system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the quantum computing fraud protection system 104 and/or by different computing devices that may form and/or otherwise make up the quantum computing fraud protection system 104. For example, the memory 150 may have, store, and/or comprise an analysis engine 150-1, a bagging cascading engine 150-2, a management engine 150-3 and/or the like. The analysis engine 150-1 may have instructions that direct and/or cause the quantum computing fraud protection system 104 to perform one or more operations associated with analyzing quantum computing code and/or programs to identify program inputs, program source information, program output information, program owner information, program download information, program resource information, program network and/or firewall access mechanism information. The bagging cascading engine 150-2 may have instructions that may cause the quantum computing fraud protection system 104 to perform analysis via a bagging cascading machine learning algorithm to analyze program inputs, program source information, program owner information, program download information, program resource information, program network and/or firewall access mechanism information and the like to identify a program intent and/or program output information. The management engine 150-3 may have instructions that may cause the quantum computing fraud protection system 104 to initiate a risk-based response based on an identification of a security risk associated with quantum computing code and/or programs submitted for execution on a quantum computer and via a quantum as a service interface.

While FIG. 1A illustrates the quantum computing fraud protection system 104, the API route testing system 105, and/or the application computing systems 108, as being separate elements connected in the private network 125, in one or more other arrangements, functions of one or more of the above may be integrated in a single device/network of devices. For example, elements in the quantum computing fraud protection system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the application computing systems 108.

Figure 2:
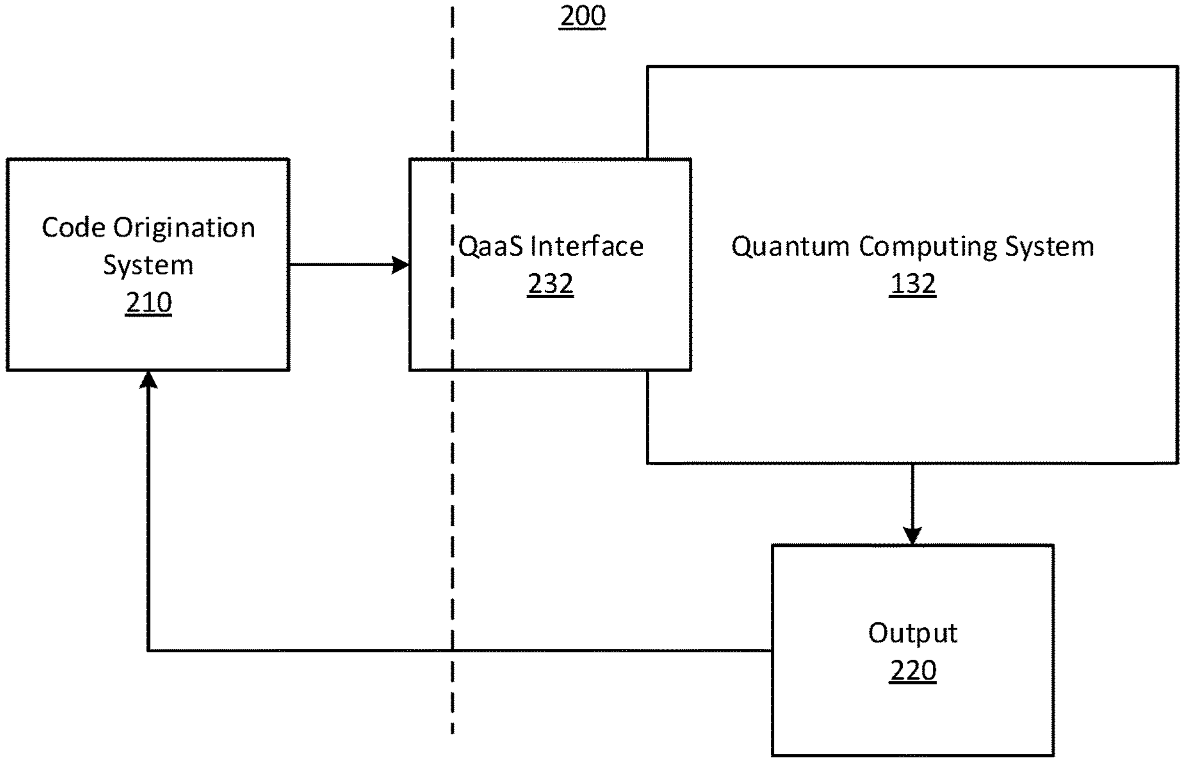
FIGS. 2 and 3 show illustrative quantum as a service (QaaS) enabled computing systems in accordance with one or more aspects described herein.
Figure 3:
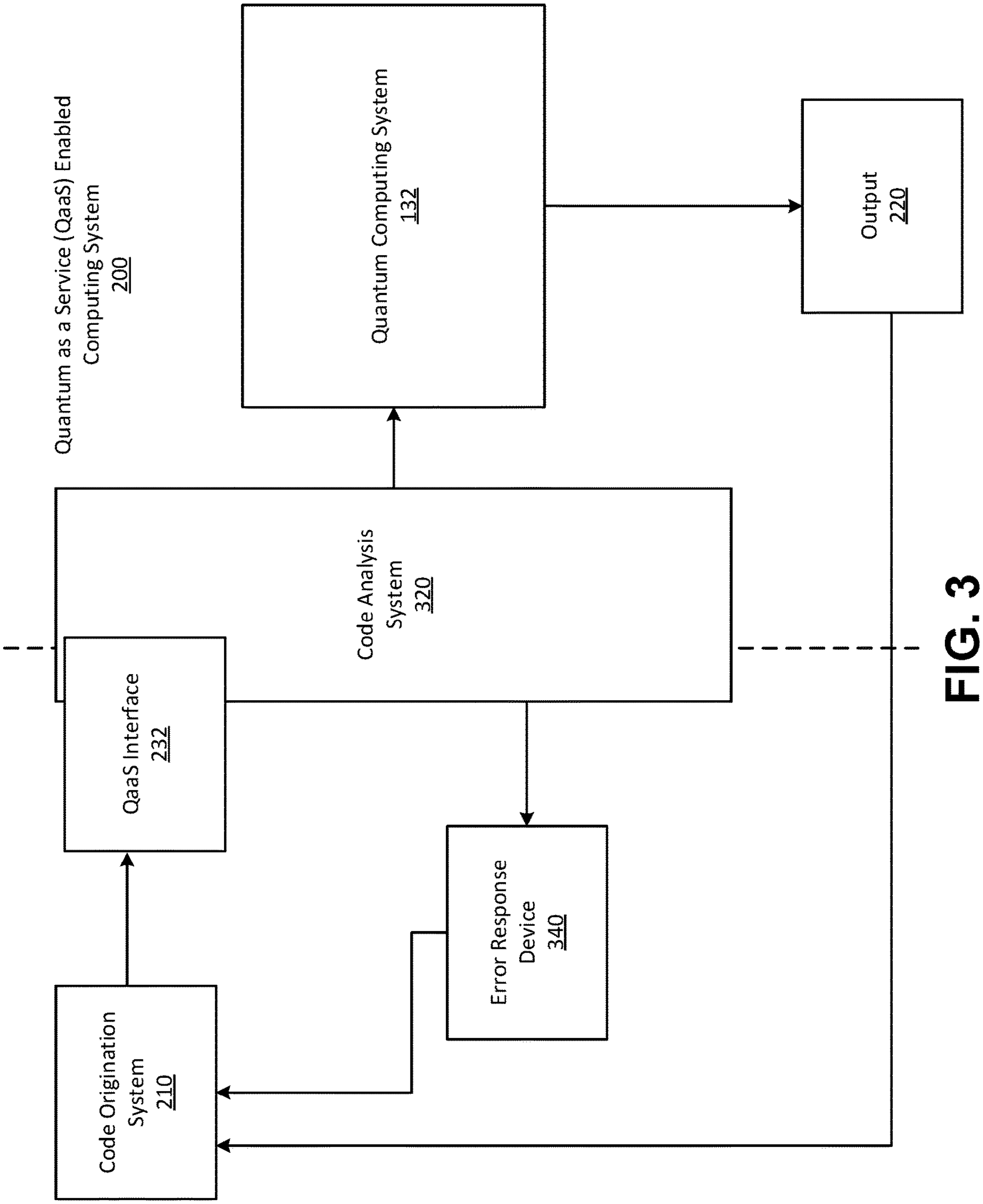

FIGS. 2 and 3 show illustrative quantum as a service (QaaS) enabled computing systems in accordance with one or more aspects described herein. For example, FIG. 2 shows a QaaS enabled computing system 200 where a code origination system 210 may provide code to be processed by the quantum computing system 132 to a QaaS interface 232 for preprocessing before sending to the quantum computing system 132 for processing. output 220 from the quantum computing system 132 may then be communicated via a network interface to the code origination system 210. FIG. 3 shows another view of the quantum enabled computing system 200 that may further include a code analysis system 320 and/or an error response computing device 340. In some cases, the code analysis system 320 may be incorporated with the QaaS interface 232. In some cases, the error response device 340 may be integrated within the code origination system 210 and/or may be include a stand-alone computing device, user interface device and/or the like.

Figure 4:
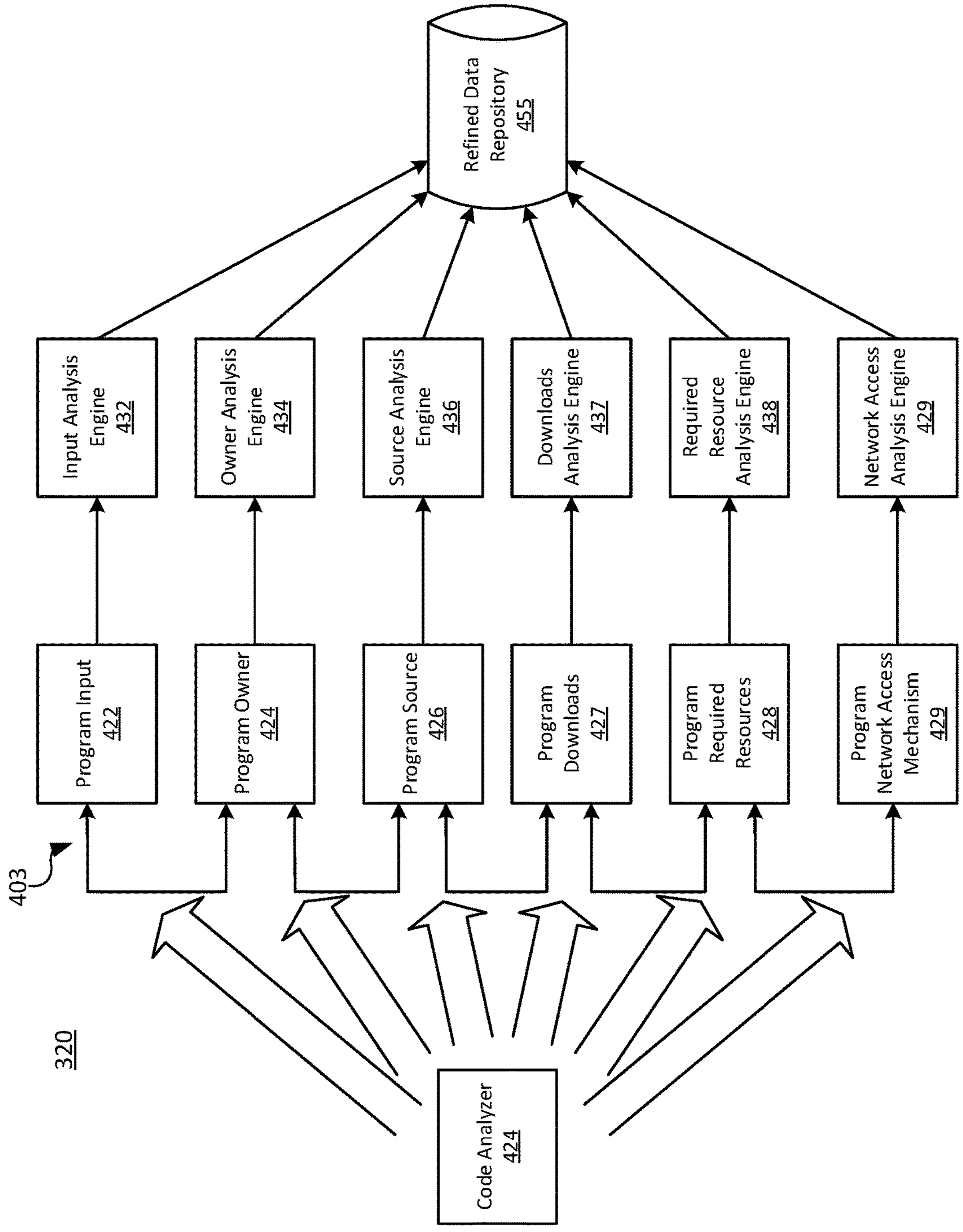
FIG. 4 show an illustrative process for analyzing quantum computing code or programs to determine an intent, in accordance with one or more aspects described herein.

FIG. 4 show an illustrative process for analyzing quantum computing code or programs to determine an intent, such as by the code analysis system 320, in accordance with one or more example arrangements. The code analysis system 320 may utilize a bagging cascading machine learning technique that operates in real-time to allow the code analysis system 320 to analyze and learn about all aspects of the incoming quantum code and/or quantum program. For example, a real-time bagging cascading mechanism may utilize a code analyzer 524 to analyze incoming quantum code to identify program characteristics including inputs, the program source, the program owner, any data access including input/output data, stored data access, networked data access, and the like. As shown in FIG. 4, the code analyzer output may include program input information 422, program owner information 424, program source information 426, program download information 427, required resource information 428 for the program, network access mechanism information 429 utilized by the program, and the like. The code analysis system 320 may leverage interdependencies 403 between each of the program components including, but not limited to, the program input information 422, program owner information 424, program source information 426, program download information 427, required resource information 428 for the program, network access mechanism information 429 utilized by the program may be identified and used for the cascading bagging technique. For example, a bagging cascading technique may utilize a training data set (e.g., the incoming quantum code and/or quantum program) to identify various bootstrap sample data sets comprising interdependencies between the different program information data sets (e.g., the program input information 422, program owner information 424, program source information 426, program download information 427, required resource information 428 for the program, network access mechanism information 429 utilized by the program, and the like). Each of the bootstrap data sets may be analyzed by different classifier/regressor analysis engines (e.g., an input analysis engine 432, an owner analysis engine 434, a source analysis engine 436, a downloads analysis engine 437, a required resource analysis engine 438, a network access analysis engine 439 where results of the analysis form a combined ensemble data set store in a refined data repository 455. The ensemble data set may be analyzed with respect to and/or otherwise combined with a test data set (e.g., quantum code results and/or process data) to generate an analysis output. Bagging is short for bootstrap aggregating is a technique to reduce the variance of a model (e.g., a quantum code and/or program analysis model) by training multiple versions of it on different subsets of the training data.

Figure 5:
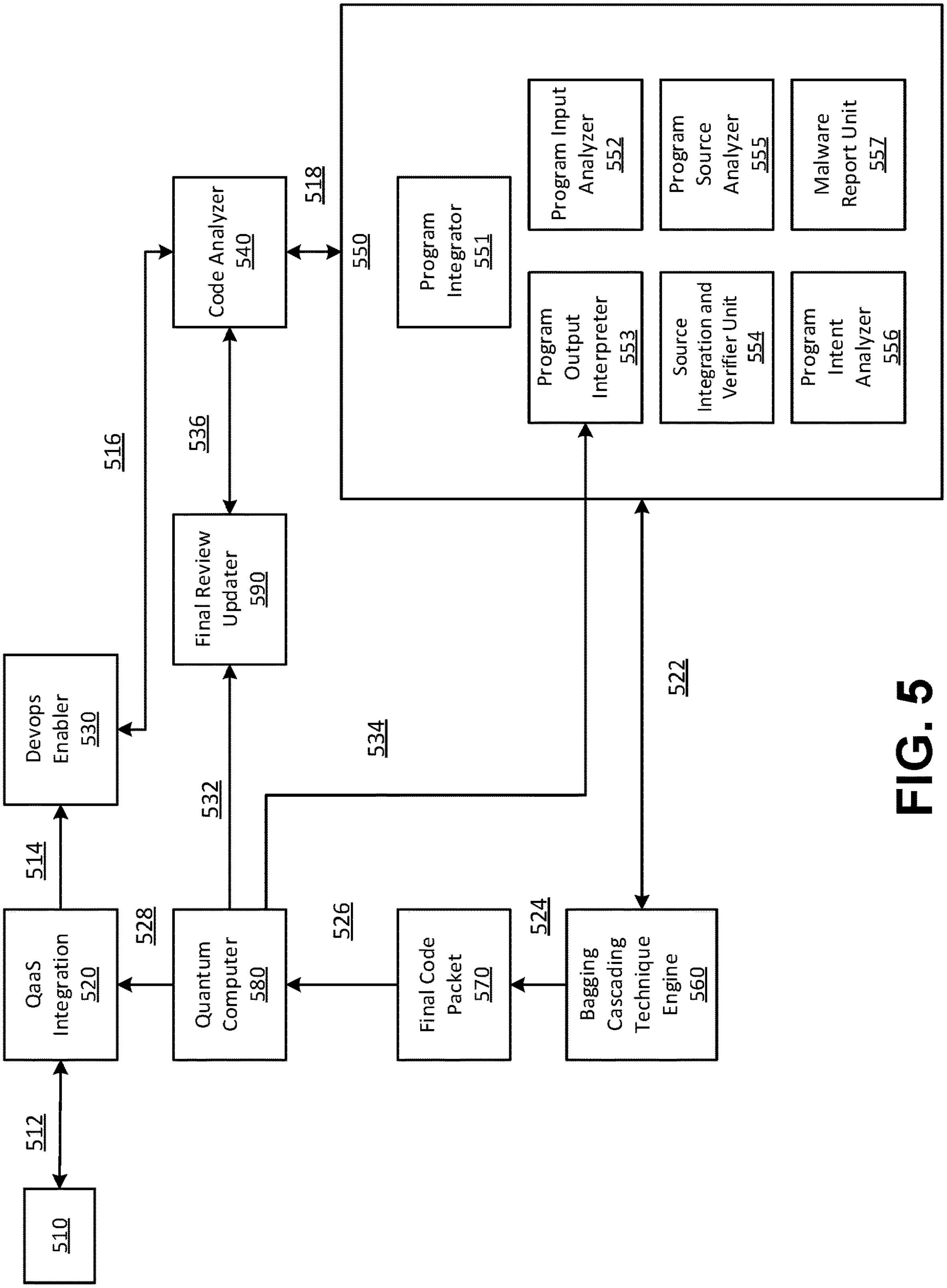
FIG. 5 shows an illustrative process to perform security and/or fraud prevention analysis of quantum computing code or programs before execution on a quantum computing device in accordance with one or more aspects described herein.

FIG. 5 shows an illustrative process to perform security and/or fraud prevention analysis of quantum computing code or programs before execution on a quantum computing device in accordance with one or more aspects described herein. At 512, a source computing system 510 may communicate the quantum code or program to a QaaS integration interface system 520 to facilitate processing of the quantum code or program by a quantum computer 580. At 514, the QaaS integration interface may direct the quantum code or program to a computing device (e.g., a Devops enabler system) to manage or otherwise initiate pre-processing of the quantum code or program. At 516, the code analyzer may receive the quantum code or program from the devops enabler and perform analysis of each line of the quantum code to identify parameters, functionality, inputs, outputs, network access requests, calculations, a program source, and/or other characteristics of the quantum code or program.

At 518, the code analyzer 540 may communicate the characteristics of the quantum code and/or program to an analysis engine 550 to perform analysis of the different characteristics, such as by using a program integrator 551, a program input analyzer 552, a program output interpreter 553, a source integration and verifier unit 554, a program source analyzer 555, a program intent analyzer 556, a malware report unit 557 and/or the like. Each of the program integrator 551, the program input analyzer 552, the program output interpreter 553, the source integration and verifier unit 554, the program source analyzer 555, the program intent analyzer 556, the malware report unit 557 and/or other data analysis engines may process the information alone and/or based on information from one or more of the other characteristics of the quantum code and/or program. In some cases, the bagging cascading technique engine 560 may coordinate aspects of the analysis at 522 to coordinate and/or manage a bagging cascading process of analysis of the data. In some case, the bagging cascading technique engine 560 may cause the malware report unit 557 to generate a malware warning, a malware alert, initiate a security lockdown process, and/or the like.

In some cases, the program integrator may identify and/or otherwise generate a processing order of the quantum code and/or program. In some cases, the program integrator may identify interdependencies between different characteristics of the quantum code and/or program. The program input analyzer 552 may analyze inputs to the quantum code and/or program to identify a data type, a data source, and/or the like of each input utilized by the quantum code and/or program. In some cases, the program input analyzer may identify whether data is being passed into the quantum computing environment and/or whether a pointer to data is being passed in to identify whether the quantum computing may access external data sources to access unknown data. In some cases, the program input analyzer 552 may identify whether an external data source being accessed is within a trusted computing environment (e.g., within an enterprise computing environment) or an unknown and/or otherwise untrusted environment (e.g., an external website, an unknown internet protocol (IP) address, and the like). In some cases, the program input analyzer 552 may identify whether the data is in a numeric format (e.g., an integer, floating point, and the like) or a character format (e.g., a character, a character string, and/or the like). In some cases, the program input analyzer 552 may identify whether the input data is in a binary format, hexadecimal format, and/or the like. In some cases, the program input analyzer 552 may identify whether the inputs correspond to a format associated with a hash value (e.g., a blockchain hash value), a password format (e.g., an unknown character string of a defined size), and/or is encrypted. In doing so, the program input analyzer 552 may utilize one or more characteristics of the code as discussed above, such as with the bagging cascading technique.

The program output interpreter 553 may analyze outputs of the quantum code and/or program to identify a data type, a destination, and/or the like of each output provided by the quantum code and/or program. In some cases, the program output interpreter 553 may identify whether data is being passed out the quantum computing environment and/or whether a pointer to data is being passed out of the quantum computer to identify whether the quantum computing attempt to allow access to data sources from an unknown computing device. In some cases, the program output interpreter 553 may identify whether the data is in a numeric format (e.g., an integer, floating point, and the like) or a character format (e.g., a character, a character string, and/or the like). In some cases, the program output interpreter 553 may identify whether the output data is in a binary format, hexadecimal format, and/or the like. In some cases, the program output interpreter 553 may identify whether the outputs correspond to a format associated with a hash value (e.g., a blockchain hash value), a password format (e.g., an unknown character string of a defined size), and/or is encrypted and/or is decrypted data, a deconstructed hash value, and/or the like. In doing so, the program output interpreter 553 may utilize one or more characteristics of the code as discussed above, such as with the bagging cascading technique.

In some cases, the source integration and verifier unit 554 and/or the program source analyzer 555 may be used to identify a source associated with the quantum code and/or program. For example, the quantum code and/or program may be provided by a computing device 510 that is obfuscating the source of the quantum code and/or program. By analyzing characteristics of the quantum code, the program source analyzer 555 and/or the source integration and verifier unit 554 may be able to identify and/or verify the program source to determine whether the quantum code and/or program has been provided by a trusted computing source, an untrusted computing source, an unverified computing device, and/or a previously identified malicious actor. The program intent analyzer 556 may analyze characteristics of the quantum code and/or program, such as the inputs, outputs, program resource utilization, program downloads, and/or other characteristics to identify an intent of the quantum code and/or program, such as via an intension score. For example, the program intent analyzer 446 may identify that an intent of the quantum code and/or program is to provide faster processing of computing code to perform a computing function more efficiently as authorized by an enterprise organization, in such cases, the intension score may indicate a positive intension (e.g., a high intension score). In some cases, the intent may be identified as an intension score (e.g., a range of values) corresponding to a likelihood that the quantum code and/or program may result in a malicious action (e.g., a low score), such as an identification of a password, unauthorized decryption of encrypted data, breaking a hash value and/or the like. The malware report unit 557 may communicate an alert and/or otherwise initiate a security operation when a malicious actor has been identified and/or a suspected malicious actor has been identified, such as via an intension threshold condition (e.g., below a specified intension score) to determine whether the quantum code may be identified as potentially malicious or potentially benign.

At 524, the bagging cascading technique engine 560 may complete processing of information received from the analysis engine 550 to re-assemble the final code packet 570 and/or to send the original quantum code and/or program, if determined to be non-malicious, to the quantum computer 580 for processing at 526. Once processed, the results may be communicated to the QaaS integration interface 520 for dissemination back to the originating computing device 510. Additionally, output from the quantum computer 580 may be communicated to the final review updater 590 at 532 to update information utilized by the code analyzer 540. For example, the output information may be used to train a machine learning algorithm utilized by the code analyzer 540 when identifying program components and/or characteristics and the interdependencies of the program components and/or characteristics. Additionally, at 534, the program output may be communicated to the program output interpreter 553 to provide feedback to the program output interpreter 553 about whether the program output was correctly identified. Such information may also be used by the program intent analyzer 556 to determine whether the program intent was correctly identified. Other components of the analysis engine 550 may utilize the quantum computer output as feedback to improve identification and/or analysis of the quantum code or program.

In some cases, the code analyzer 540 and/or the devops enabler 530 may access a data repository storing historical information associated with quantum code and/or programs received by the QaaS integration interface 520. For example, the code analyzer 540 may use historical information to identify similar problematic code when received to stop processing if a malicious intent has already been identified. This historical information may be updated by the code analyzer 540 based on feedback about analyzed code that was run by the quantum computer and the quantum computer output, such as by receiving information from the final review updater 590.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A system comprising:
- a quantum computing device;
- a quantum as a service (QaaS) interface platform, comprising:
  - a processor; and
  - memory storing computer-readable instructions that, when executed by the processor, cause the QaaS interface platform to:
    - receive, via a network, quantum code requested to be executed by the quantum computing device;
    - identify, from the quantum code and before execution of the quantum code, characteristics of the quantum code;
    - identify, based on dependencies between the characteristics of the quantum code and via a bagging cascading technique before execution of the quantum code, an intent of the quantum code, wherein the bagging cascading technique comprises analyzing program input, program source, program owner, program output, program downloads, program resource utilization, and program firewall access mechanisms via parallel learning;
    - send, via a communication interface and based on identification of an indication of a benign intent of the quantum code, the quantum code to the quantum computing device; and
    - cause, based on the indication of a benign intent, execution of the quantum code by the quantum computing device.

2. The system of claim 1, wherein the characteristics of the quantum code comprise at least two of program input information, program source information, program output information, program resource utilization, program download information, and program network access information.

3. The system of claim 2, wherein the program network access information comprises an identification of a firewall access mechanism.

4. The system of claim 1, wherein the instructions cause the QaaS interface platform to, based on an indication of a malicious intent, initiate a network security process.

5. The system of claim 1, wherein the instructions cause the QaaS interface platform to train a code analysis engine based on output from the quantum computing after execution of the quantum code.

6. The system of claim 5, wherein the instructions cause the QaaS interface platform to calculate a program intension score based on analysis of the quantum code via the bagging cascading technique, wherein the program intension score is compared to a threshold to identify whether the intent of the quantum code is benign or malicious.

7. The system of claim 6, wherein the instructions cause the QaaS interface platform, based on identification of a potential risk or security threat, to alert a quantum computing organization monitoring device, and await further input before allowing execution of the quantum code.

8. A method comprising:

receiving, at a quantum as a service (QaaS) interface platform, via a network, quantum code requested to be executed by a quantum computing device;

identifying, from the quantum code and before execution of the quantum code, characteristics of the quantum code;

identifying, based on dependencies between the characteristics of the quantum code and via a bagging cascading technique before execution of the quantum code, an intent of the quantum code, wherein the bagging cascading technique comprises analyzing program input, program source, program owner, program output, program downloads, program resource utilization, and program firewall access mechanisms via parallel learning;

sending, via a communication interface and based on identification of an indication of a benign intent of the quantum code, the quantum code to the quantum computing device; and executing, based on the indication of a benign intent, the quantum code by the quantum computing device.

9. The method of claim 8, wherein the characteristics of the quantum code comprise at least two of program input information, program source information, program output information, program resource utilization, program download information, and program network access information.

10. The method of claim 9, wherein the program network access information comprises an identification of a firewall access mechanism.

11. The method of claim 8, further comprising causing, based on an indication of a malicious intent, initiation of network security process.

12. The method of claim 8, further comprising training a code analysis engine based on output from the quantum computing after execution of the quantum code.

13. The method of claim 8, further comprising calculating a program intension score based on analysis of the quantum code via the bagging cascading technique, wherein the program intension score is compared to a threshold to identify whether the intent of the quantum code is benign or malicious.

14. The method of claim 13, further comprising alerting, based on identification of a potential risk or security threat, a quantum computing organization monitoring device, and await further input before allowing execution of the quantum code.

15. Non-transitory computer readable media storing instructions that, when executed by a processor, cause a quantum as a service (QaaS) interface platform to:

receive, via a network, quantum code requested to be executed by a quantum computing device;

identify, from the quantum code and before execution of the quantum code, characteristics of the quantum code;

identify, based on dependencies between the characteristics of the quantum code and via a bagging cascading technique before execution of the quantum code, an intent of the quantum code, wherein the bagging cascading technique comprises analyzing program input, program source, program owner, program output, program downloads, program resource utilization, and program firewall access mechanisms via parallel learning;

send, via a communication interface and based on identification of an indication of a benign intent of the quantum code, the quantum code to the quantum computing device; and cause, based on the indication of a benign intent, execution of the quantum code by the quantum computing device.

16. The non-transitory computer readable media of claim 15, wherein the characteristics of the quantum code comprise at least two of program input information, program source information, program output information, program resource utilization, program download information, and program network access information.

17. The non-transitory computer readable media of claim 16, wherein the program network access information comprises an identification of a firewall access mechanism.

18. The non-transitory computer readable media of claim 15, wherein the instructions cause the QaaS interface platform, based on an indication of a malicious intent, initiation of network security process.

19. The non-transitory computer readable media of claim 15, wherein the instructions cause the QaaS interface platform to train a code analysis engine based on output from the quantum computing after execution of the quantum code.

20. The non-transitory computer readable media of claim 15, cause the QaaS interface platform to calculate a program intension score based on analysis of the quantum code via the bagging cascading technique, wherein the program intension score is compared to a threshold to identify whether the intent of the quantum code is benign or malicious.

* * * * *